United States Patent [19]

Kouchiwa

[11] Patent Number: 4,711,536
[45] Date of Patent: Dec. 8, 1987

[54] COLOR SEPARATING LENS COMPOSED OF THREE LENS UNITS

[75] Inventor: Taira Kouchiwa, Kamakura, Japan

[73] Assignee: Ricoh Company, Ltd., Tokyo, Japan

[21] Appl. No.: 759,055

[22] Filed: Jul. 25, 1985

[30] Foreign Application Priority Data

Jul. 25, 1984 [JP] Japan .................. 59-154949

[51] Int. Cl.$^4$ .................. G02B 9/14
[52] U.S. Cl. .................. 350/476
[58] Field of Search .................. 350/476

[56] References Cited

U.S. PATENT DOCUMENTS 4,415,241 11/1983 Shinohara .................. 350/476

FOREIGN PATENT DOCUMENTS 2841602 3/1979 Fed. Rep. of Germany ...... 350/476

Primary Examiner—John K. Corbin
Assistant Examiner—Rebecca D. Gass
Attorney, Agent, or Firm—Oblon, Fisher, Spivak, McClelland, & Maier

[57] ABSTRACT

Disclosed is a color separating a color separating lens composed of 3 lens units which is small in number of lenses, can be manufactured at less cost and can provide a good focusing performance over the entire visible area.

2 Claims, 4 Drawing Figures (1)

(2)

(3)

COLOR SEPARATING LENS COMPOSED OF THREE LENS UNITS

BACKGROUND OF THE INVENTION

1. Field of the Invention

The present invention relates to a color separating reduced optical system lens for a color scanner, a color facsimile and the like, and more specifically to a color separating a color separating lens composed of 3 lens units composed of four units and four pieces of lenses.

2. Description of the Prior Art

In a system wherein an original surface is subject to slit exposure scanning, and an image of a slit-like portion to be scanned of the original surface is reduced and focussed by means of a lens on a light receiving surface of a solid state image sensor (for example, CCD) to read an original, since the solid state image sensor is low in MTF (modulation transfer function), a high MTF is required for a lens. Further, in focussing a reduced image on the surface of the solid state image sensor, a read bit position of an original surface and a corresponding read bit position of the solid state image sensor are brought into registration with each other, and therefore, it is desired to minimize a bend of an image, i.e., a distortion. Moreover, since a quantity of light reduces from an axis toward a marginal portion of an original in accordance with the $COS^4$ rule, an almost perfect vignetting factor up to the extreme marginal portion of the original is required in view of the necessity of increasing the quantity of light in the marginal portion of the original as much as possible on the solid state image sensor.

Also, in recent FAX and the like, machineries are intended to be miniaturized and light-weighted, and even in layouting optical systems, miniaturizing and light-weighting have been desired. In view of this, lenses of less length and less outer diameter are required.

On the other hand, when a color original is color-separated into three colors, R, G and B by a color scanner, a color FAX and the like to focus the respective color information on the solid state image sensor by the lens, a chromatic aberration need be sufficiently compensated unlike a conventional monochromatic reduced optical system lens.

In the conventional monochromatic reduced optical system lens, a quality of light has a wave length in the vicinity of 550 nm which is substantially close to a visual sensitivity, and for compensation of chromatic aberration, approximately 550 nm±50 nm has been satisfactory. However, when a color information of a color original is faithfully readout, since color of the color original is present over the entire visible area, it is necessary to compensate for the chromatic aberration of the lens with respect to the quality of light over the entire visible area. In addition, in a system wherein a color separation element is present in a space between the lens and the solid state image sensor to color-separate a color original into R, G and B, if an optical path length within the color separation element is long, when this color separation element is added to a conventional lens, an aberration of the conventional lens is fallen toward a positive side, failing to attain a sufficient focusing performance. Accordingly, in such a color separation system, a focusing lens is necessary which has a sufficient performance on the solid state image sensor even if the optical path length within the color separation element is long.

The conventional color separating reduced optical system lens has been difficult to meet these requirements as noted above.

When a thick-wall parallel plane glass is added between the conventional focusing lens and the solid state image sensor, an image plane is excessively fallen toward a positive side, deteriorating a focusing performance. Therefore, a focussing lens is necessary which is compensated for aberration when the parallel plane glass is added. This poses a problem in that the overall length of the lens is long and the lens becomes large in size.

SUMMARY OF THE INVENTION

The present invention has been achieved to solve the aforementioned problems. It is an object of the invention to provide a color separating a color separating lens composed of 3 lens units which is small in number of lenses, can be manufactured at less cost and can provide a good focusing performance over the entire visible area.

To achieve the aforesaid object, the present invention provides a color separating a color separating lens composed of 3 lens units comprising a first unit lens which is a positive single meniscus lens (a first lens) having a convex surface directed toward an object side, a second unit lens which is a double-concave lens (a second lens), a third unit lens having a negative meniscus lens (a third lens) having a concave surface directed toward an image side and a double-convex lens (a fourth lens) cemented together, and a fourth unit lens which is a parallel plane glass (a fifth lens), said color separating a color separating lens composed of 3 lens units satisfying the following conditions:

(1) $5.5f < r_2 < 6.5f$
(2) $8f < r_5 < 16f$
(3) $0.1f < d_1 < 0.15f$
(4) $0.02f < d_4 < 0.04f$
(5) $1.75 < n_1 < 1.85$, $41 < v_1 < 53$
(6) $1.75 < n_4$, $38 < v_4 < 50$
(7) $50 < v_5$ where $r_2$ is a radius of curvature of the first lens on the image side, $r_5$ a radius of curvature of the third lens on the object side, $d_1$ a wall-thickness of the first lens, $d_4$ an air spacing between the second lens and the third lens, $n_1$ is a refractive index of the first lens, $n_4$ is a refractive index of the fourth lens, $v_1$ an Abbe's number of the fourth lens, $v_5$ an Abbe's number of the fifth lens, and f a synthetic focal length of the entire system.

The condition (1) is provided to compensate for a curve of an image plane and a comatic aberration. When a value exceeds the upper limit, the image plane is excessively negative whereas when a value exceeds the lower limit, the comatic aberration increases to increase a flare component to deteriorate a contrast. The range of the condition (1) is adequate.

The condition (2) is provided to compensate for a curve of an image plane similar to the condition (1). When a value exceeds the upper limit, the image plane is excessively positive whereas when a value exceeds the lower limit, the image plate is excessively negative.

The condition (3) indicates a value which determines the range of a half field angle used in the structure of the present invention. Even when a value exceeds the upper and lower limits, an astigmatic difference increases, and the using field angle is a narrow angle.

The condition (4) indicates the range for compensating for a distortion. Even when a value exceeds the upper and lower limits, a distortion increases. Particularly, in the reduced optical system according to the present invention, actual use of this cannot be made. Accordingly, the range of the condition (4) is adequate.

The condition (5) as well as the conditions (6) and (7) is provided to compensate for a chromatic aberration. When a value exceeds levels in these ranges, compensation of chromatic aberration is impossible to make. A deviation in best image plane position in each color separated color over the entire visible area increases and an error in focusing magnification of each of colors R, G and B within the optical layout increases, resulting in an extreme color deviation.

In the condition (6), particularly when a value exceeds the aforesaid range, compensation of chromatic aberration is impossible to make in the front lens.

DETAILED DESCRIPTION OF THE PREFERRED EMBODIMENT

Figure 1:
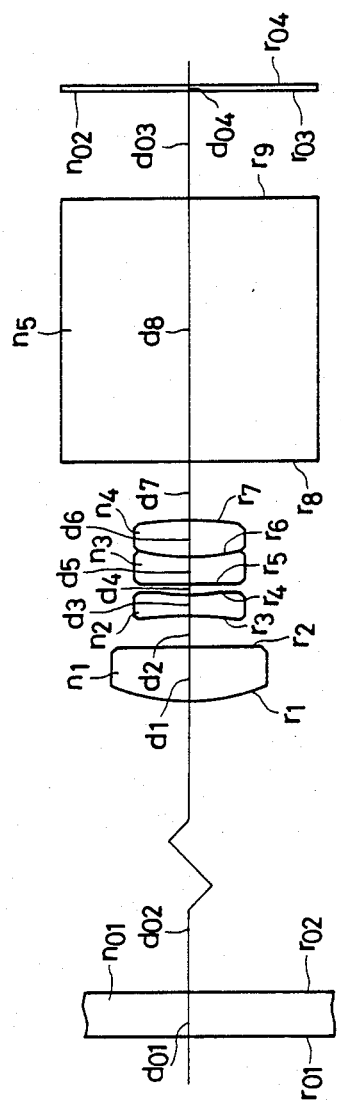
FIG. 1 is a sectional view of a lens system of the present invention.

An embodiment of the present invention will now be described in detail. FIG. 1 is a sectional view of a color separating a color separating lens composed of 3 lens units to which the present invention is applied.

Numerical values in Table 1 are those taken where the aperture ratio is 1:5.6, the focal length of the entire system $f=100$, magnification $m=-1/10.59$, and half field angle $w=14.4°$.

TABLE 1

| ro1 | ∞ | do1 | 9.9954 | no1 | 1.51825 | vo1 | 63.93 |
|---|---|---|---|---|---|---|---|
| ro2 | ∞ | do2 | 1144.3693 | | | | |
| r1 | 40.8811 | d1 | 12.3943 | n1 | 1.77620 | v1 | 49.42 |
| r2 | 605.5802 | d2 | 7.1967 | | | | |
| r3 | −97.463 | d3 | 4.6778 | n2 | 1.72311 | v2 | 29.29 |
| r4 | 32.8888 | d4 | 2.8787 | | | | |
| r5 | 1277.6297 | d5 | 5.9972 | n3 | 1.58482 | v3 | 40.47 |
| r6 | 36.873 | d6 | 9.3957 | n4 | 1.83945 | v4 | 42.48 |
| r7 | −76.9644 | d7 | 13.9935 | | | | |
| r8 | ∞ | d8 | 59.9723 | n5 | 1.51825 | v5 | 63.93 |
| r9 | ∞ | do3 | 24.1546 | | | | |
| ro3 | ∞ | do4 | 1.3994 | no2 | 1.51825 | vo2 | 63.93 |
| ro4 | ∞ | | | | | | |

(1) $r2 = 6.0558f$
(2) $r5 = 12.776297f$
(3) $d1 = 0.123943f$
(4) $d4 = 0.028787f$
(5) $n1 = 1.77620$, $v1 = 49.42$
(6) $n4 = 1.83945$, $v4 = 42.48$
(7) $v5 = 63.93$

In the above table, symbols are:

ro1, ro2: Radius of curvature of surface and back of an original placing glass shown at a left end of FIG. 1 ro3, ro4: Radius of curvature of surface and back of a protective glass of a solid state image sensor shown at a right end of FIG. 1 r1, ... r9: Radius of curvature of lens surfaces successively from an object side do1: Spacing between surface and back of the original placing glass do2: Spacing between back of the original placing glass lens surface on the object side of the first unit lens do3: Spacing between surface of the parallel plane glass on the image side and surface of the protective glass of the solid state image sensor do4: Spacing surface and back of the solid state image sensor d1, ... d8: Spacing between lens surfaces successively from the object side no1: Refractive index of the original placing glass no2: Refractive index of the protective glass of the solid state image sensor n1, ... n5: Refractive index of lenses successively from the object side vo1: Abbe's number of the original placing glass vo2: Abbe's number of the protective glass of the solid state image sensor v2, ... v5: Abbe's number of lenses successively from the object side.

Next, the Seidel aberration coefficient in the above-described embodiment in case of $f=1$ is shown in Table 2. In Table 2, P indicates the Petzval's term, S the term of spherical aberration, C the term of comatic aberration, A the term of astigmatism, and D the term of distortion.

TABLE 2

| | P | S | C | A | D |
|---|---|---|---|---|---|
| r1 | 1.06895 | 3.60098 | 1.47212 | 0.60182 | 0.68303 |
| r2 | −0.07216 | 2.78074 | −1.72583 | 1.07111 | −0.61998 |
| r3 | −0.43058 | −6.55983 | 2.22351 | −0.75368 | 0.40141 |
| r4 | −1.27598 | −3.09842 | −2.54776 | −2.09497 | −2.77185 |
| r5 | 0.02888 | 0.01929 | 0.07938 | 0.32671 | 1.46347 |
| r6 | 0.23688 | 1.47296 | 1.15140 | 0.90003 | 0.88872 |
| r7 | 0.59295 | 2.47511 | −0.62765 | 0.15916 | −0.19072 |
| r8 | 0. | −0.32468 | 0.30126 | −0.27953 | 0.25937 |
| r9 | 0. | 0.10103 | −0.09375 | 0.08699 | −0.08071 |
| Σ | 0.14895 | 0.46720 | 0.23269 | 0.01764 | 0.03273 |

Figure 2:
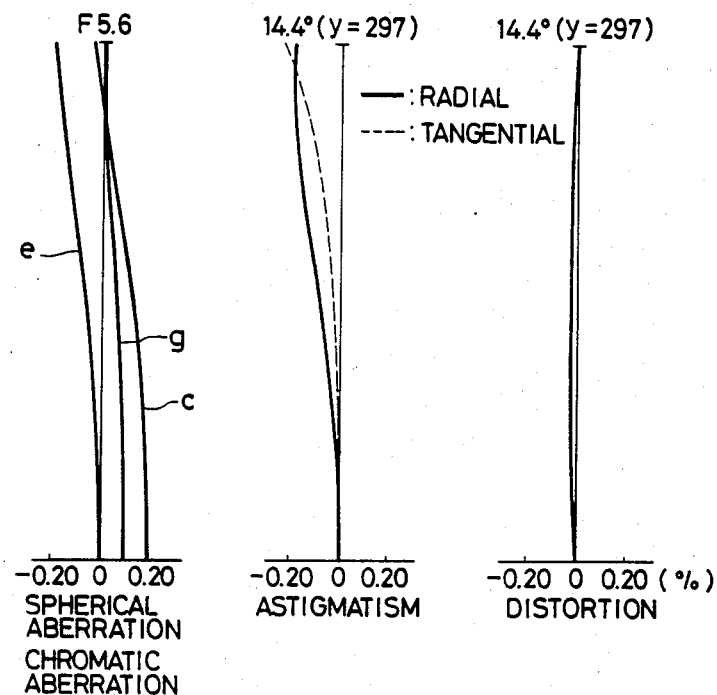
FIG. 2 are, successively from left, curves of spherical aberration, chromatic aberration, astigmatism, and distortion.
Figure 3:
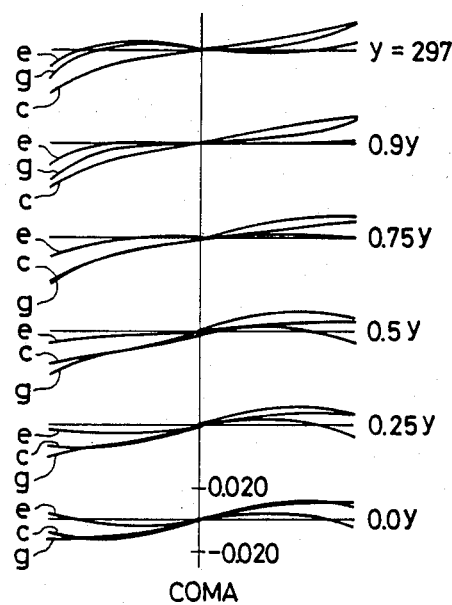
FIG. 3 is a curve of a comatic aberration.

FIGS. 2 and 3 show aberration curves in the embodiment according to the present invention. FIG. 2 shows a spherical aberration and chromatic aberration curve, an astigmatism curve, a distortion aberration curve, successively from the left.

A central view of FIG. 2 is an astigmatism aberration curve of an e-line relative to an object height=297, and a right-hand view of FIG. 2 is a distortion curve of an e-line relative to an object height Y=297.

As will be apparent from these views, the shperical aberration and chromatic aberration are well compensated, and particularly, the chromatic aberration over the entire visible area is well compensated, providing a sufficient performance as a color separating reduced optical system lens which readouts a color original. Further, also in astigmatism, radial as well as tangential are well coincided. There is no astigmatic difference, and it is well coincided with the best focus position on the axis and the image plane is flat. The astigmatism is less than 0.05% which is very small, and compensation of aberration is well effected.

Comatic aberration affecting a contract of an image is as shown in FIG. 3. As clearly shown, a high contrast is provided almost in the same degree from the center to the extreme marginal portion.

Figure 4:
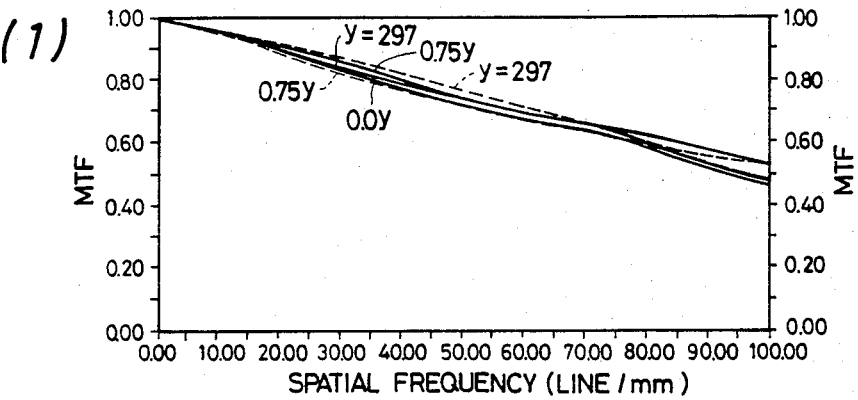
FIG. 4 is an MTF curve.
Figure 4:
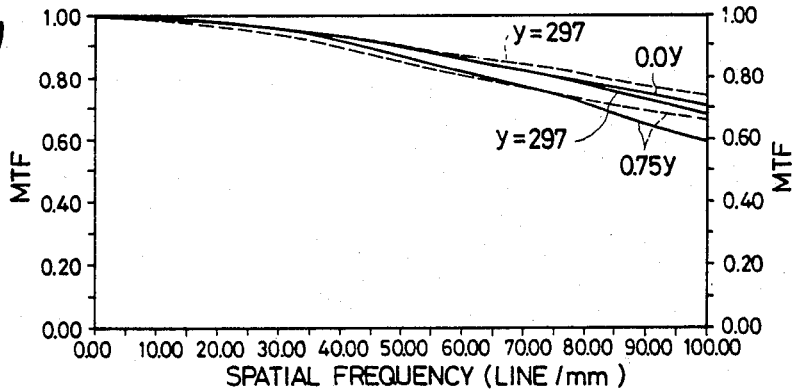
Figure 4:
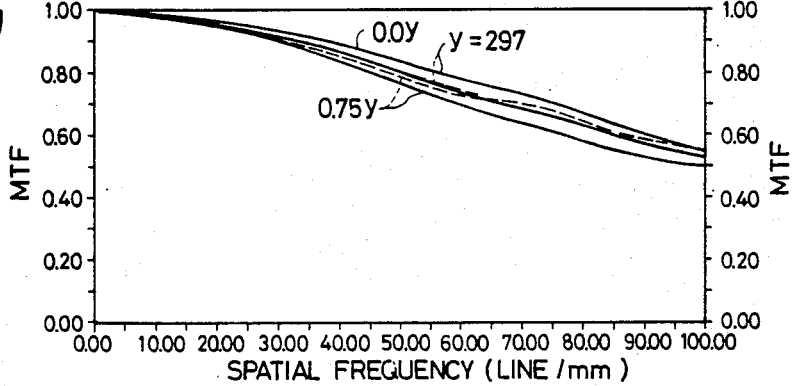

FIG. 4 shows the MTF and image face frequency. As may be clear from FIG. 3, MTF of each color when separated into R, G and B is sufficiently high up to the high frequency. FIGS. 4 (1), (2) and (3) show the relationship between the MTF and the image face frequency of B color-separated, G color-separated, and R color-separated, respectively. FIG. 4 shows the focusing performance in case of f=50.

As described above, the color separating a color separating lens composed of 3 lens units of the present invention makes it possible to provide a lens system of high performance in which chromatic aberration is sufficiently compensated despite a small number of lenses, a high contrast is obtained up to a half field angle of approximately ±15° over the entire visible area while being used in the vicinity of a reducing rate of 1/10 times with an aperture ratio of 5.6, a distortion is restrained as small as possible, and a vignetting factor is 100%.

What is claimed is:

1. A color separating lens composed of three lens units comprising a first unit lens which is a positive single meniscus lens (a first lens) having a convex surface directed toward an object side, a second unit lens which is a double-concave lens (a second lens), a third unit lens having a negative meniscus lens (a third lens) having a concave suface directed toward an image side and a double convex lens (a fourth lens) cemented together, and a fourth unit lens which is a parallel plane glass (a fifth lens), said color separating lens composed of three lens units being satisfied with the following conditions:

(1) $5.5f < r_2 < 6.5f$
(2) $8f < r_5 < 16f$
(3) $0.1f < d_1 < 0.15f$
(4) $0.02f < d_4 < 0.04f$
(5) $1.75 < n_1 < 1.85, 41 < v_1 < 53$
(6) $1.75 < n_4, 38 < v_4 < 50$
(7) $50 < v_5$ where is a radius of curvature of the first lens on the image side, r5 a radius of curvature of the third lens on the object side, d1 a wall-thickness of the first lens, d4 an air spacing between the second lens and the third lens, n1 is a refractive index of the first lens, n4 is a refractive index of the fourth lens, v1 an Abbe's number of the fourth lens, V5 an Abbe's number of the fifth lens, and f a synthetic focal length of the entire system.

2. A color separating lens composed of three lens units according to claim 1 having the following data:

| ro1 | ∞ | do1 | 9.9954 | no1 | 1.51825 | vo1 | 63.93 |
|---|---|---|---|---|---|---|---|
| ro2 | ∞ | do2 | 1144.3693 | | | | |
| r1 | 40.881 | d1 | 12.3943 | n1 | 1.77620 | v1 | 49.42 |
| r2 | 605.5802 | d2 | 7.1967 | | | | |
| r3 | −97.463 | d3 | 4.6778 | n2 | 1.72311 | v2 | 29.29 |
| r4 | 32.8888 | d4 | 2.8787 | | | | |
| r5 | 1277.6297 | d5 | 5.9972 | n3 | 1.58482 | v3 | 40.47 |
| r6 | 36.873 | d6 | 9.3957 | n4 | 1.83945 | v4 | 42.48 |
| r7 | −76.9644 | d7 | 13.9935 | | | | |
| r8 | ∞ | d8 | 59.9723 | n5 | 1.51825 | v5 | 63.93 |
| r9 | ∞ | do3 | 24.1546 | | | | |
| ro3 | ∞ | do4 | 1.3994 | no2 | 1.51825 | vo2 | 63.93 |
| ro4 | ∞ | | | | | | | in the above table, symbols are:

ro1, ro2: Radius of curvature of surface and back of an original placing glass shown at a left end of FIG. 1 ro3, ro4: Radius of curvature of surface and back of a protective glass of a solid state image sensor shown at a right end of FIG. 1 r1, ... r9: Radius of curvature of lens surface successively from an object side do1: Spacing between surface and back of the original placing glass do2: Spacing between back of the original placing glass lens surface on the object side of the first unit lens do3: Spacing between surface of the parallel plane glass on the image side and surface of the protective glass of the solid state image sensor do4: Spacing surface and back of the solid state image sensor d1, ... d8: Spacing between lens surfaces successively from the object side no1: Refractive index of the original placing glass no2: Refractive index of the protective glass of the solid state image sensor n1, ... n5: Refractive index of lenses successively from the object side vo1: Abbe's number of the original placing glass Vo2: Abbe's number of the protective glass of the solid state image sensor V1, ... v5: Abbe's number of lenses successively from the object side.

* * * * *